US006536567B2

(12) United States Patent
Nakanishi

(10) Patent No.: US 6,536,567 B2
(45) Date of Patent: Mar. 25, 2003

(54) INERTIA DAMPER AND METHOD FOR MANUFACTURING SAME

(75) Inventor: Motoyasu Nakanishi, Shizuoka-ken (JP)

(73) Assignee: Kabushiki Kaisha Sigel, Tokyo (JP)

( * ) Notice: Subject to any disclaimer, the term of this patent is extended or adjusted under 35 U.S.C. 154(b) by 0 days.

(21) Appl. No.: 09/816,153

(22) Filed: Mar. 26, 2001

(65) Prior Publication Data

US 2002/0043438 A1 Apr. 18, 2002

Related U.S. Application Data

(63) Continuation of application No. 09/576,718, filed on May 23, 2000, now abandoned, which is a continuation of application No. 09/370,243, filed on Aug. 9, 1999, now abandoned, which is a continuation of application No. 08/950,181, filed on Oct. 14, 1997, now abandoned, which is a continuation of application No. 08/782,828, filed on Jan. 13, 1997, now abandoned, which is a continuation of application No. 08/643,766, filed on May 6, 1996, now abandoned, which is a continuation of application No. 08/498,229, filed on Jul. 5, 1995, now abandoned, which is a continuation of application No. 08/319,094, filed on Oct. 6, 1994, now abandoned, which is a continuation of application No. 08/170,976, filed on Dec. 21, 1993, now abandoned, which is a continuation of application No. 08/020,451, filed on Feb. 22, 1993, now abandoned, which is a continuation of application No. 07/866,125, filed on Apr. 7, 1992, now abandoned, which is a continuation of application No. 07/707,199, filed on May 28, 1991, now abandoned, which is a continuation of application No. 07/493,147, filed on Mar. 14, 1990, now abandoned.

(30) Foreign Application Priority Data

Mar. 14, 1989 (JP) ............................................. 1-61365

(51) Int. Cl.[7] .................................................. F16F 7/10
(52) U.S. Cl. ........................................ 188/378; 188/386
(58) Field of Search .................................. 188/378, 379, 188/380

(56) References Cited

U.S. PATENT DOCUMENTS

| 3,545,301 | A | 12/1970 | Richter |
| 3,552,230 | A | 1/1971 | McLean ..................... 188/378 |
| 3,555,926 | A | 1/1971 | Moorhouse et al. ........ 188/378 |
| 3,790,831 | A | 2/1974 | Morreale |
| 4,049,985 | A | 9/1977 | Sudler |
| 4,392,681 | A | 7/1983 | Raquet |
| 4,395,809 | A | 8/1983 | Whiteley |
| 4,563,605 | A | 1/1986 | Gerber |
| 4,800,306 | A | 1/1989 | Oberto |
| 4,825,983 | A | 5/1989 | Nakanishi ................... 188/378 |
| 4,938,325 | A | 7/1990 | Nakagawa |

FOREIGN PATENT DOCUMENTS

| EP | 0 283 234 | 9/1988 |
| JP | 52-60913 | 5/1977 |
| JP | 64-83946 | 3/1989 |
| JP | 1-227651 | 9/1989 |

*Primary Examiner*—Matthew C. Graham
(74) *Attorney, Agent, or Firm*—Wenderoth, Lind & Ponack, L.L.P.

(57) ABSTRACT

An inertia damper is capable of exhibiting satisfactory endurance. In the inertia damper, when an inertia weight element directly carrying out a damping action and a gel element are combined together, the gel element is interposedly arranged between the outer periphery of the inertia weight element and the inner surface of a peripheral cover section of a holding member of a mount base. This permits the area of arrangement of the gel element to be increased to significantly reduce loading per unit area of the gel element, thereby improving the endurance.

19 Claims, 10 Drawing Sheets

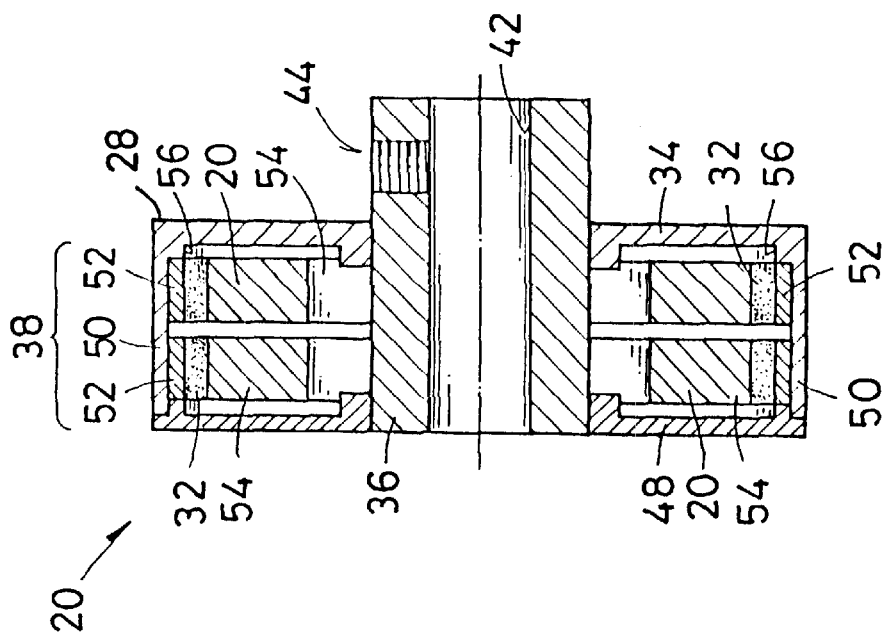
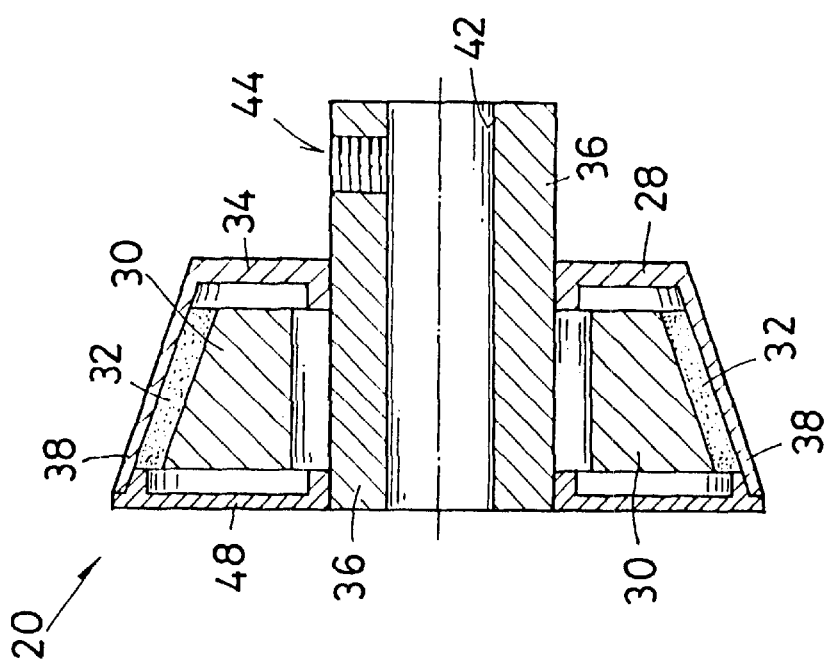

FIG.11A
FIG.11B
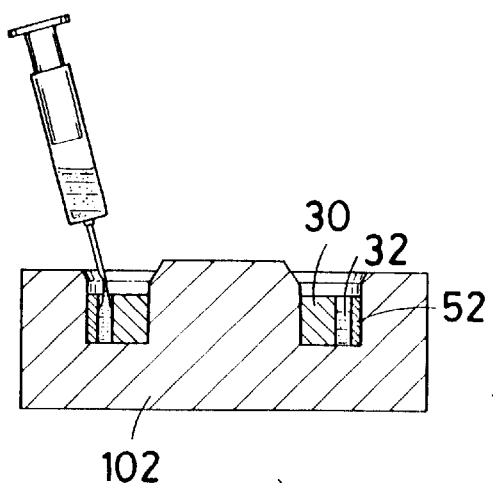
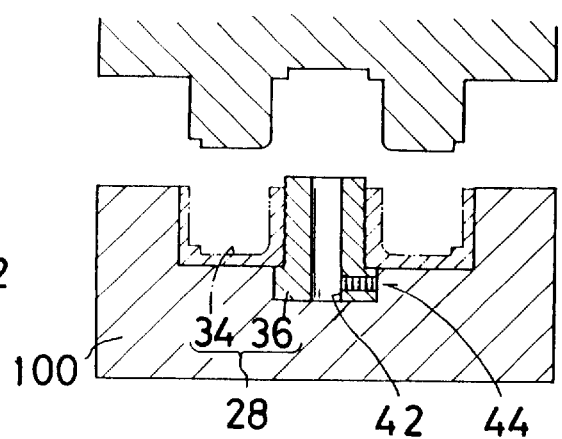
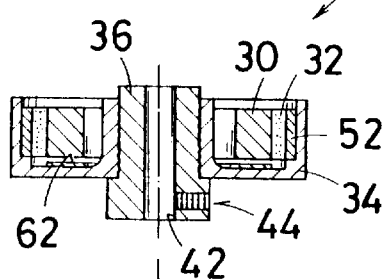
FIG.11C
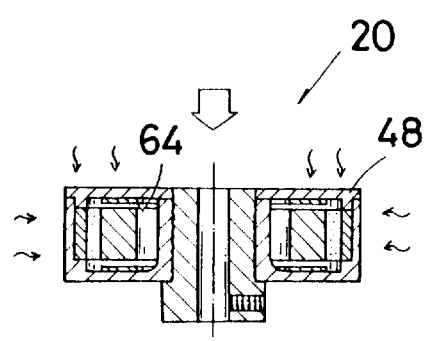
FIG.11D

INERTIA DAMPER AND METHOD FOR MANUFACTURING SAME

This application is a CON of Ser. No. 09/576,718 May 23, 2000 abandoned which is a CON of Ser. No. 09/370,243 Aug. 9, 1999 abandoned which is a CON of Ser. No. 08/950,181 Oct. 14, 1997 abandoned which is a CON of Ser. No. 08/782,828 Jan. 13, 1997 abandoned which is a CON of Ser. No. 08/643,766 May 6, 1996 abandoned which is a CON of Ser. No. 08/498,229 Jul. 5, 1995 abandoned which is a CON of Ser. No. 08/319,094 Oct. 6, 1994 abandoned which is a CON of Ser. No. 08/170,976 Dec. 21, 1993 abandoned which is a CON of Ser. No. 08/020,451 Feb. 22, 1993 abandoned which is a CON of Ser. No. 07/866,125 Apr. 7, 1992 abandoned which is a CON of Ser. No. 07/707,199 May 28, 1991 abandoned which is a CON of Ser. No. 07/493,147 Mar. 14, 1990 abandoned.

BACKGROUND OF THE INVENTION

This invention relates to an inertia damper and a method for manufacturing the same, and more particularly to an inertia damper adapted to be incorporated in a device, such as a stepping motor widely used as a drive source for office automation equipment, various kinds of automatic production units or the like, to converge vibration of the stepping motor during the step response of the stepping motor and transient vibration of a rotary shaft of the stepping motor and a method for manufacturing the same.

A stepping motor which exhibits excellent functions such as accurate driving, rapid stopping, rapid starting and the like has disadvantages that the transient response during rising at the time of starting rotation is apt to be vibratory and unstable phenomena such as resonance in a fixed frequency domain of a drive power supply and the like fail to permit the rotation of the motor to be smoothly carried out. Accordingly, in order to properly drive equipment by the stepping motor, a mechanism for eliminating such disadvantages is necessarily required. In view of the foregoing, the inventor has developed an inertia damper utilizing a gel material that it exhibits good vibration absorbing characteristics. In the proposed inertia damper, a mount base is mounted on a rotary shaft of a motor. However, the inertia damper fails to exhibit sufficient endurance under various operating conditions. More particularly, the proposed inertia damper, as shown in FIG. 1, includes a mount base 28, an inertia weight component 30 and a gel material 32 and is constructed in such a manner that the mount base 28 and inertia weight component 30 are connected to each other through the gel material 32 arranged between the inner peripheral surface of the inertia weight component 30 formed into an annular shape and a boss 36 of the mount base 28 in a vibration absorbing manner. Thus, in the conventional inertia damper constructed as described above, a space in which the gel material 32 is arranged is formed into relatively small dimensions, so that the gel material 32 may very satisfactorily absorb vibration of a small magnitude. However, such construction fails to cause the gel material 32 to exhibit satisfactory absorption of vibrations of a large magnitude, as well as exhibit good endurance under the operating conditions where a large amount of vibration energy is applied thereto.

SUMMARY OF THE INVENTION

The present invention has been made in view of the foregoing disadvantage of the prior art.

Accordingly, it is an object of the present invention to provide an inertia damper which is capable of exhibiting satisfactory endurance even under the operating conditions where an excessive load is applied to the inertia damper. It is another object of the present invention to provide an inertia damper which is capable of satisfactorily absorbing vibration of a large magnitude. It is a further object of the present invention to provide an inertia damper which is capable of accomplishing the above-described objects with a simple structure.

It is still another object of the present invention to provide a method for manufacturing an inertial damper capable of exhibiting satisfactory endurance even under the operating conditions where the excessive load is applied to the inertia damper. It is a still further object of the present invention to provide a method for manufacturing an inertia damper which is capable of easily providing an inertial damper.

In accordance with one aspect of the present invention, an inertia damper is provided which comprises a mount base, an inertia weight element and a gel element. The mount base and inertia weight element are coupled to each other through the gel element in a vibration absorbing manner. The mount base is formed on the outer periphery thereof with a peripheral cover section to define a housing space therein for receiving the inertia weight element. The gel element is interposed between the outer peripheral surface of the inertia weight element and the inner peripheral surface of the peripheral cover section to couple the inertia weight element and mount base to each other in a vibration absorbing manner.

In accordance with another aspect of the present invention, a method for manufacturing an inertia damper is provided. The method comprises the steps of setting an inertia weight element and an inner sleeve in a mold in a manner to be spaced from each other at a predetermined distance, pouring a gel material between the inertia weight element and the inner sleeve and curing the gel material to form a gel element and constitute a unit comprising the inertia weight element, inner sleeve and gel element, forming a mount base, incorporating the unit into the mount base, covering the mount base with a lid, and subjecting the mount base and lid to assembly to carry out welding between the mount base and the inner sleeve and welding between the inner sleeve and the lid.

BRIEF DESCRIPTION OF THE DRAWINGS

These and other objects and many of the advantages of the present invention will be readily appreciated as the same becomes better understood by reference to the following detailed description when considered in connection with the accompanying drawings in which like reference numerals designate like or corresponding parts throughout, wherein:

FIG. 6 is a vertical sectional view showing still another embodiment of an inertia damper according to the present invention;

FIG. 7 is a vertical sectional view showing yet another embodiment of an inertia damper according to the present invention;

FIGS. 11A to 11D show steps of manufacturing the inertia damper shown in FIG. 8, wherein FIG. 11A is a vertical sectional view showing a gel pouring step, FIG. 11B is a vertical sectional view showing an insert molding step, FIG. 11C is a vertical sectional view showing an assembling step and FIG. 11D is a vertical sectional view showing a welding step.

DETAILED DESCRIPTION OF THE PREFERRED EMBODIMENTS

Now, an inertia damper according to the present invention will be described hereinafter with reference to the accompanying drawings.

Figure 2:
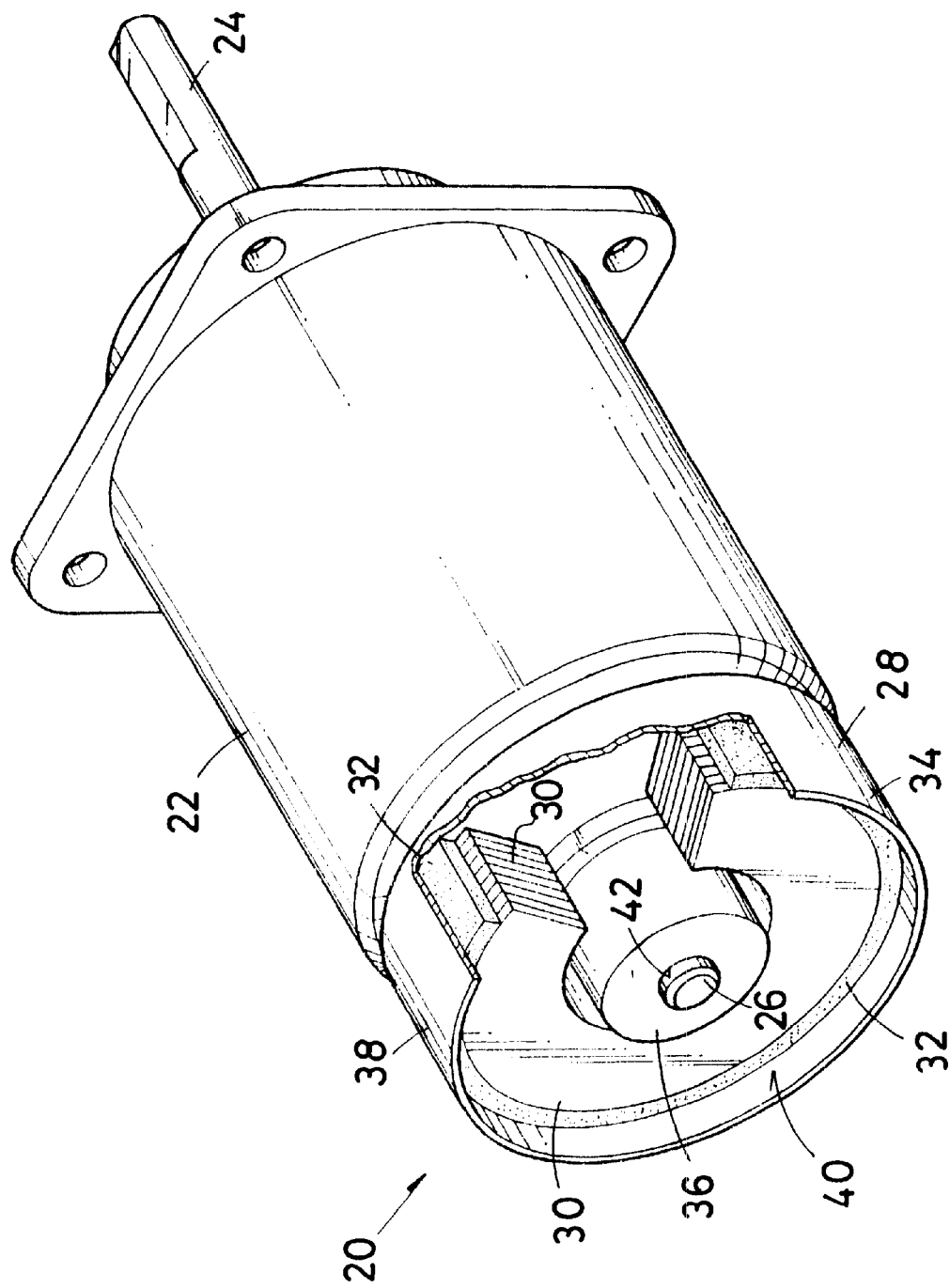
FIG. 2 is a partially cutaway perspective view showing a stepping motor in which an embodiment of an inertia damper according to the present invention is incorporated.
Figure 3:
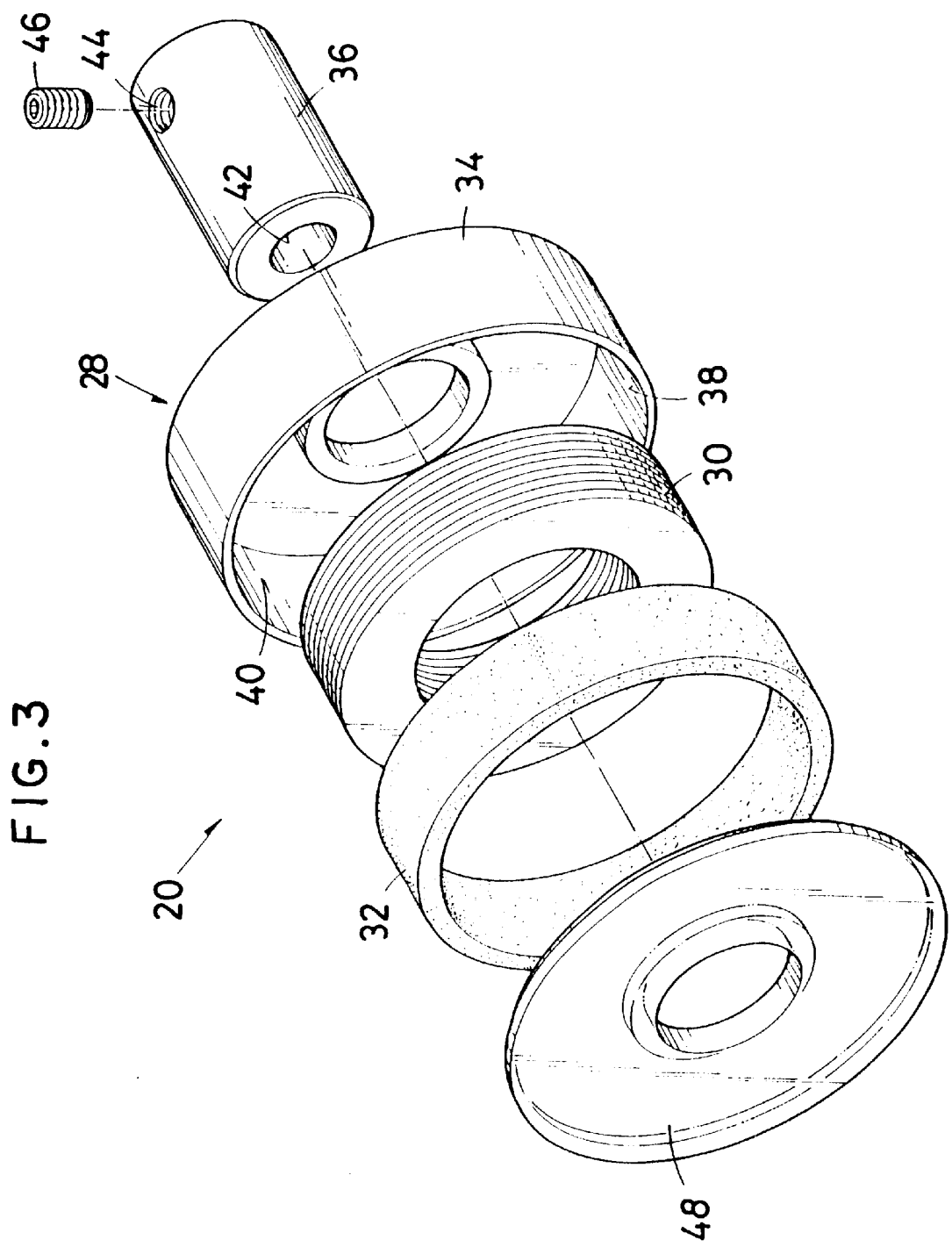
FIG. 3 is an exploded perspective view of the inertia damper shown in FIG. 2.

FIG. 2 shows a stepping motor on which an embodiment of an inertia damper according to the present invention is mounted and FIG. 3 shows an inertial damper of the embodiment, wherein an inertia damper and a stepping motor are designated by reference numerals 20 and 22, respectively. In the illustrated embodiment, the inertia damper 20 is mounted on one side of the stepping motor 22 and arranged substantially coaxial with a drive shaft 24 provided on the other side of the stepping motor 22 so as to outward extend therefrom. More specifically, the inertia damper 20 is mounted on a mounting shaft 26 of the stepping motor 22 provided on the one side thereof so as to outward extend therefrom substantially coaxial with the drive shaft 24. Alternatively, it is a matter of course that the inertia damper 20 may be arranged on the inner side of a housing of the stepping motor 22. However, it should be noted that the inertia damper of the present invention may be conveniently applied to various kinds of drive sources of which function is affected by inertia occurring at the time of the starting or the like, such as, for example, a motor different in kind from a stepping motor, an internal combustion engine, a hydraulic motor, an air motor and the like.

Now, the inertia damper 20 of the illustrated embodiment will be described in detail hereinafter with reference to FIGS. 2 and 3.

The inertia damper 20 of the embodiment generally includes a mount base 28 through which the inertia damper is mounted on the mounting shaft 26 of the stepping motor 22, an inertia weight component or element 30 and a gel element 32. The mount base 28 may be made of a suitable material such as, for example, metal such as aluminum alloy or the like. Alternatively, the mount base 28 may be formed of a synthetic resin material such as an engineering plastic material, a ceramic material or the like. For example, the mount base 28 may comprise a holding member 34 and a boss 36 coupled or connected together between which the inertia weight element 30 and gel element 32 are directly mounted. The holding member 34 and boss 36 may be integrally coupled to each other by press-fitting. Alternatively, they may be integrally connected together using a suitable means such as welding, screws or the like after press-fitting.

The holding member 34 may be formed into an annular shape so that an opening through which the boss 36 is coupled thereto may provided. The holding member 34 is provided on the outer periphery thereof with a peripheral cover section 38, to thereby define a housing space 40 in the mount base 28. In the illustrated embodiment, the peripheral cover section 38 is formed into a cylindrical shape and to axially extend from the holding member 34. Thus, it will be noted that the mount base 28 is substantially closed with the holding member 34 on one side in the axial direction thereof and open on the other or opposite side.

In the illustrated embodiment, the housing space 40 has a substantially annular shape because the boss 36 extends into the space 40. The boss 36 is formed with a shaft fit-in through-hole 42 in a manner to extend in the axial direction thereof, in which the mounting shaft 26 of the stepping motor 22 is fitted. Also, the boss 36 is formed with a threaded hole 44 into which a locking bolt 46 is threadedly inserted to securely fix the boss 36 with respect to the mounting shaft 26 of the stepping motor 22. For this purpose, the bolt hole 44 is formed in a manner to extend in a direction perpendicular to the shaft fit-in hole 42 and communicate with the hole 42.

The mount base 28 may be provided on the open side thereof with a cover plate 48 so as to close the open of the base 28. Such arrangement of the cover plate 48 permits the inner structure of the inertia damper 20 to be closedly received in the mount base 28, to thereby effectively prevent dust or the like from entering the inertia damper. Also, this prevents volatiles from the gel element 32, such as gas, vaporized oil and the like from escaping to adversely affect electrical contacts of the stepping motor.

The inertia weight element 30 is arranged in the housing space 40 of the so-constructed mount base 28 in a manner to define a gap sufficient to arrange the gel element 32 therein between the peripheral cover section 38 of the holding member 34 and the inertial weight element 30. The mount base 28 and inertia weight element 30 are connected to each other through the so-arranged gel element 32. In the illustrated embodiment, the inertia weight element 30 is formed into an annular shape corresponding to the annular shape of the housing space 40. When the inertia damper is the type that the boss 36 does not extend into the housing space 40, the inertial weight element 30 may be formed into a circular or disc-like shape.

The gel element 32 which constitutes one of features of the present invention is interposedly arranged between the inner surface of the peripheral cover section 38 and the outer peripheral surface of the inertia weight element 30 to couple the inertia weight element 30 and mount base 28 to each other while converging or absorbing vibration to prevent transmission of vibration. The gel element 32 is made of a gel material. The gel material suitable for use for forming the gel element 32 may be selected from the group consisting of urethane gel, acrylic gel and other suitable gel materials. In particular, it was found that silicone gel is optimum for the gel element 32 because it is exhibits stable characteristics over a wide temperature range, does not produce any by-products during curing and exhibits excellent vibration absorbing performance. Silicone gel consists of dimethyl siloxane units and may be a silicone polymer of the addition reaction type prepared by curing a mixture consisting of components A and B described below. The component A is a diorganopolysiloxane of the following general formula (I)

$$RR^1{}_2SiO-(R^2{}_2SiO)_n SiR^1{}_2R \qquad (I)$$

wherein R designates an alkenyl group, $R^1$ represents a monovalent hydrocarbon group free of any aliphatically unsaturated bond, $R^2$ is a monovalent hydrocarbon group containing a methyl group of at least 50 mol % and, if contained, an alkenyl group of 10 mol % or less and n is a number which is sufficient to permit the viscosity of the component at a temperature of 25° C. to be within the range of from 100 cSt to 100,000 cSt. The component B is organohydrogen polysiloxane which has a viscosity of 5000 cSt or less at a temperature of 25° C. and has at least three combinations of a Si atom and a hydrogen atom(s) directly bonded to the Si atom in one molecule. The so-prepared mixture is adjusted to cause a ratio (molar ratio) of the total amount or number of alkenyl groups contained in diorganopolysiloxane (component A) to the total amount or number of hydrogen atoms directly bonded to the Si atoms of organohydrogen polysiloxane (component B) to be within the range of from 0.1 to 2.0.

Now, the silicone gel will be described in more detailed hereinafter. The above-described component A or diorganopolysiloxane is a compound which has a straight-chain molecular structure and permits each of the alkenyl groups R at both ends or terminals of the molecule to addition-react with the hydrogen atom(s) directly bonded to the Si atoms f the component B to form a crosslinked structure. The alkenyl groups at both terminals of the molecule each are preferably a lower alkenyl group and more preferably a vinyl group in view of its reactivity.

The group $R^1$ at each terminal of the molecule is a monovalent hydrocarbon group free of any aliphatically unsaturated bond and includes, for example, an alkyl group such as a methyl group, a propyl group or a hexyl group, a phenyl group and a fluoroalkyl group and the like.

In the formula (I) described above, the group $R^2$ is a monovalent aliphatic hydrocarbon group and includes, for example, an alkyl group such as a methyl group, a propyl group or a hexyl group, a lower alkenyl group such as a vinyl group, and the like. The group $R^2$ contains at least 50 mol % of methyl group. The group $R^2$ may contain an alkenyl group and, in this case, the amount of alkenyl group is preferably 10 mol % or less. The amount of alkenyl group above 10 mol % causes the crosslink density to be excessively increased, resulting in the viscosity of the component A being excessively increased. The value of n is set so as to permit the viscosity of the component A at a temperature of 25° C. to be within the range of from 100 cSt to 100,000 cSt and preferably from 200 cSt to 20,000 cSt.

The above-described component B or organohydrogen polysiloxane acts as a crosslinking agent for the component A. The hydrogen atoms directly bonded to the Si atoms of the component B are addition-reacted with alkenyl groups of the component A to effect curing. The component B may have any molecular structure such as a straight-chain structure, a branched chain structure, a cyclic structure, a network structure or the like. To the silicon atoms of the component B may be bonded organic groups in addition to hydrogen atoms. The organic group is normally a lower alkyl group such as a methyl group. The viscosity of the component B at a temperature of 25° C. is 5000 cSt or less and preferably 500 cSt or less.

The component B includes, for example, a copolymer of organohydrogen siloxane of which both terminals are blocked with triorganosiloxane groups, a copolymer of diorganosiloxane and organohydrogensiloxane, tetraorgano tetrahydrogen cyclotetrasiloxane, a copolymerized polysiloxane composed of an $HR^1{}_2SiO_{1/2}$ unit and an $SiO_{4/2}$ unit, and a copolymerized cyclohaxane composed of $HR^1{}_2SiO_{1/2}$ unit, a $R^1{}_3SiO_{1/2}$ and a $SiO_{4/2}$. In these formulas, $R^1$ has the same meaning as described above.

The components A and B are mixed together in such amounts that the molar ratio of the total amount of alkenyl groups on the silicon atoms of the component A to the total mount of hydrogen atoms directly bonded to the silicone atoms of the component B is in the range of 0.1 to 0.2 and preferably 0.1 to 1.0, resulting in the mixture. Then, the so-obtained mixture is cured by a curing reaction, leading to the silicone gel. The curing reaction may be carried out using a platinum catalyst. The platinum catalyst used for this purpose includes, for example, finely divided elemental platinum, chloroplatinic acid, platinum chloride, complex salts of olefin with platinum, platinum alcoholate and complex salts of vinylsiloxane with chloroplatinic acid. Such a platinum catalyst may be generally used in an amount of 0.1 ppm or more, in terms of elemental platinum, based on the total amount of the components A and B and preferably 0.5 ppm or more. The amount of platinum catalyst does not have any specific upper limit; however, if the catalyst is in the form of liquid or may be used in the form of solution, good results may be obtained when the catalyst is used in an amount of 200 ppm or less.

The above-described component A, component B and catalyst are mixed together to prepare a mixture, which is then allowed to stand or is heated, resulting in being cured, leading to the silicone gel used in the present invention.

The so-obtained silicone gel generally has a rate of penetration of approximately 5 to 250 when measured in accordance with JIS K-2207-1980 (50 g load). In the present invention, the silicone gel having a rate of penetration of 50 to 200 is preferably used. The hardness of such a silicone gel may be adjusted by using the component A in an amount larger than the amount sufficient to form a crosslinked structure by the reaction with hydrogen atoms directly bonded to Si of the component B. Alternatively, the adjustment may be carried out by previously adding silicone oil having methyl groups at both terminals thereof in an amount of from 5 to 75 wt % based on the silicone gel to be prepared.

The silicone gel may be adjusted as described above or may be commercially available. A commercially available silicone gel which may be used in the present invention includes silicone gels sold under the designations CF 5027, TOUGH-2, TOUGH-3, TOUGH-4, TOUGH-5, TOUGH-6 and TOUGH-7 from Kabushiki Kaisha Toray Silicone, Japan; silicone gel sold under the designation X-32-902/cat1300 from Shin-Etsu kagaku Kogyo Kabushiki Kaisha, Japan; silicone gel sold under the designation F250-121 from Nippon Yunika Kabushiki Kaisha, Japan; and the like.

In addition to the above-described component A, component B and catalyst, components such as a pigment, a curing delay agent, a flame retardant, a filler and the like may be added in amounts which do not cause deterioration of characteristics of the silicone gel. Further, a composite silicone gel material having a microballoon-like filler contained therein may be used. The composite silicone gel used includes, for example, Fillite (registered trademark) commercially available from Nippon Fillite Kabushiki Kaisha, Japan, Expancel (registered trademark) commercially available from Nippon Fillite Kabushiki Kaisha, Japan, Matsumoto Microsphere (trade name) commercially available from Matsumoto Yushi Seiyaku Kabushiki Kaisha, Japan, and the like. Good results may be obtained using a composite silicone gel material prepared by, for example, adding Expancel described above in an amount of 3 wt % to a base comprising CF 502 described above of which a rate of penetration was adjusted to about 150. In the illustrated embodiment, TOUGH-7 described above of which a rate of penetration was adjusted to 100 was used. The silicone gel having a rate of penetration as high as, for example, about 160 is suitably used to eliminate a resonance phenomenon, whereas the silicone gel having a lower rate of penetration of, for example, 100 is particularly effective to improve settling time.

In the illustrated embodiment, as described above, the mount base 28 comprises two members or the holding member 34 and boss 36. Accordingly, when the two members are suitably selectively combined, the inertia damper of the illustrated embodiment may be constructed in various ways. The arrangement of the gel element between the outer peripheral surface of the inertia weight element 30 and the inner peripheral surface of the peripheral cover section 38 may be carried out by inserting the inertia weight element 30 into the housing space 40 while supporting it in a manner to somewhat lift it, pouring the gel material uncured into the gap between the peripheral cover section 38 of the holding member 34 and the inertia weight element 30, and then curing the gel material by heating. Alternatively, it may be carried out by cutting the gel material previously formed into a sheet-like shape to form the gel element 32 of a strip-like shape and then winding the gel element 32 around the outer periphery of the inertia weight element 30.

When it is required to strengthen bonding between the gel element 32 and the inertia weight element 30 and bonding between the peripheral cover section 38 of the mount base 28 and the gel element 32, it is desirable to previously apply a silicone primer and/or a silicone adhesive of the addition reaction type on the surface of each of these members. As described in detail in Japanese Patent Application Laid-Open Publication No. 242774/1989 which discloses an invention made by the inventor, such a silicone primer includes, for example, Primer A (trade name) commercially available from Toray Silicone Kabushiki Kaisha, Japan, Primer Z-3042 commercially available from Bayer Gohsei Silicone Kabushiki Kaisha, Japan and the like. To the above-described silicone primer may be added a coupling agent such as triethoxysilane or the like. Also, the silicone adhesive of the addition reaction type may be applied after the silicone primer is coated, resulting in the bonding being more effectively carried out. A silicone adhesive which performs addition reaction with the silicone gel by heating to cure the silicone gel may be used as such a silicone adhesive of the addition reaction type. The silicone adhesive used includes, for example, KE-1800T commercially available from Shin-Etsu Kagaku Kabushiki Kaisha, Japan, SE-1700 commercially available from Taray Silicone Kabushiki Kaisha, Japan and the like. Further, as the silicone adhesive of the addition reaction type may be used a composition comprising such a mixture of diorganopolysiloxane and organohydrogen polysiloxane as described above wherein the molar ratio between the vinyl group of the organohydrogen polysiloxane and the hydrogen of Si—H bond of the organohydrogen polysiloxane is hydrogen-excessive. For example, a composition may be used in which the ratio between the vinyl group and the hydrogen of the Si—H bond is within the range between 1:1.05 to 1:2.02.

On the surface of each of the members to which the silicone primer and/or silicone adhesive are applied as required is contactedly arranged the silicone gel uncured, which is then heated. This causes not only the silicone gel to be cured, but the silicone primer and/or adhesive applied to the inner surface of the peripheral cover section 38 acting as a support for the silicone gel to be reacted with the silicone gel to strengthen the joining between the silicone gel and the peripheral cover, section 38. When a composite silicone gel material in which a filler is contained is used for forming the gel element 32, it is desirable that an uncured silicone gel material free of a filler is first applied and then the filler containing the silicone gel material uncured is applied thereonto, which are then subject curing by heating.

Figure 4:
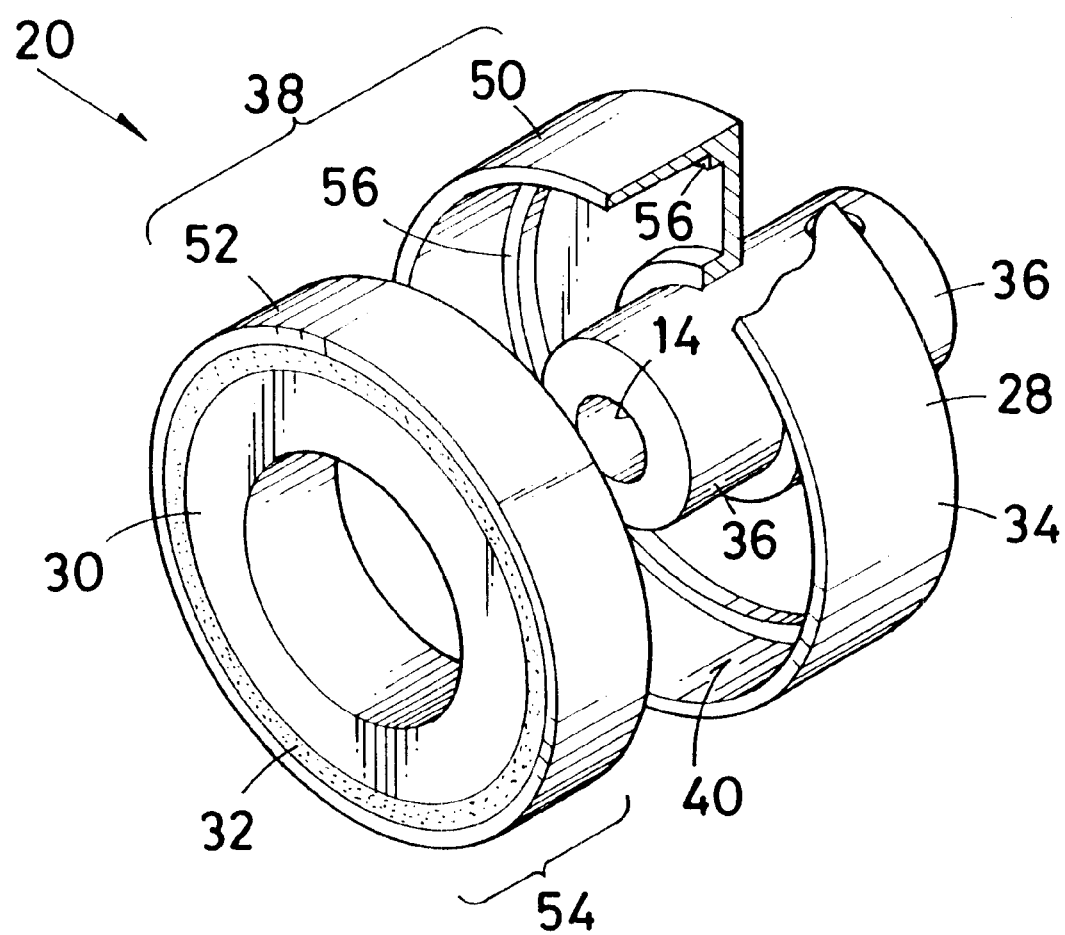
FIG. 4 is a partially cutaway exploded perspective view showing another embodiment of an inertia damper according to the present invention.

FIG. 4 shows another embodiment of an inertia damper according to the present invention. In an inertia damper shown in FIG. 4, a peripheral cover section 38 is constructed into a two-layer structure. More particularly, in the illustrated embodiment, the peripheral cover section 38 includes an outer cover plate 50 formed integral with a holding member 34 of a mount base 28 and an inner sleeve 52 formed separate from the outer cover plate 50 and tightly fitted in the outer cover plate 50. Such construction of the peripheral cover section 38 permits the inner sleeve 52, an inertia weight element 30 and a gel element 32 to be previously assembled together by combining the inner sleeve 52 with the inertia weight element 30 and then filling a gel material between both to form the gel element 32, resulting in a unit 54 being formed. The so-assembled unit 54 is then fitted and positioned in the outer cover plate 50. For the purpose of accurately and readily positioning the unit in the outer sleeve, the outer sleeve 50 may be provided therein with a positioning means of a suitable shape such as an annular shape against which the unit 54 is abutted. The above-described construction of the illustrated embodiment permits the holding member 34 to be made in fixed dimensions and the inertia weight element 30 to be selected depending upon its damping characteristics, resulting in the inertia damper being constructed in various ways depending upon the specifications desired, application thereof or the like. Also, the unit 54 may be assembled by pouring the gel material between the inner sleeve 52 and the inertia weight element 30 while putting the inertia weight element 30 and inner sleeve 52 on a support such as a platen without keeping the inertia weight element 30 lifted, to thereby facilitate the manufacturing of the inertia damper.

The remaining part of the embodiment shown in FIG. 4 may be constructed in substantially the same manner as the embodiment described above.

Figure 5:
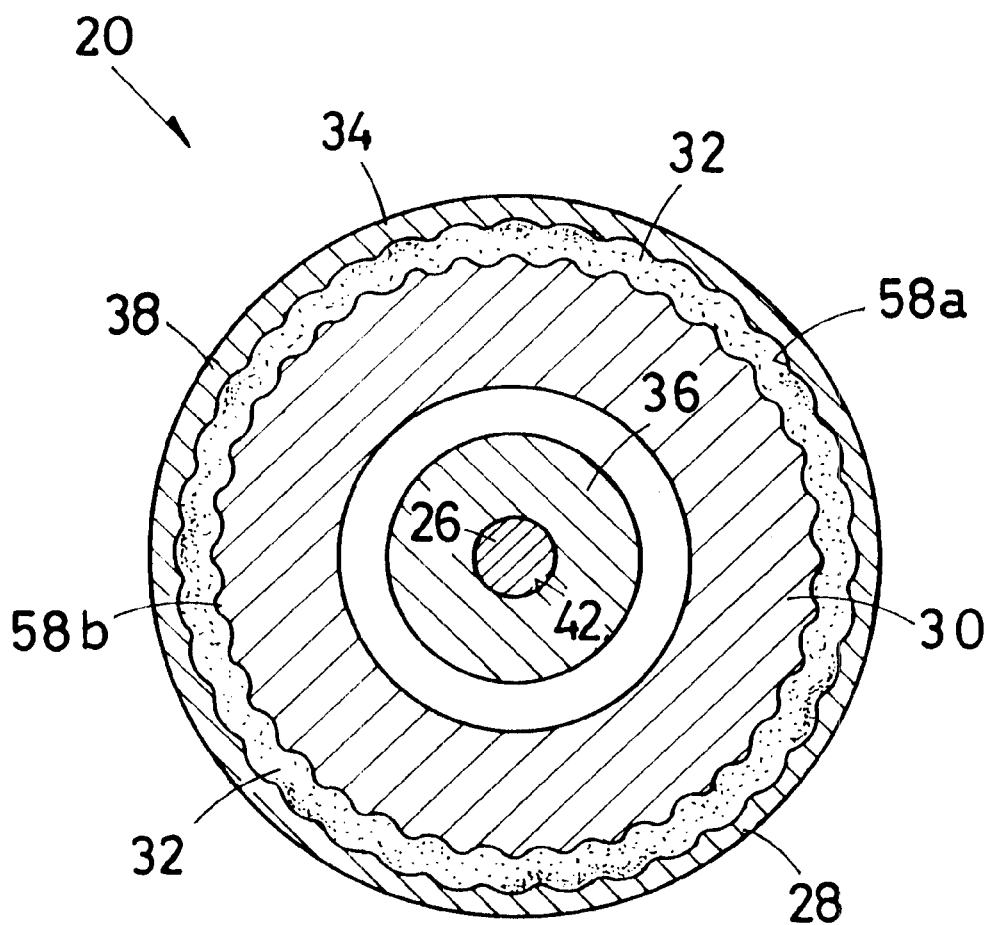
FIG. 5 is a cross sectional view showing a further embodiment of an inertia damper according to the present invention.

FIG. 5 shows a further embodiment of an inertia damper according to the present invention. In an inertia damper shown in FIG. 5, the surfaces of a holding member 34 and an inertia weight element 30 opposite to each other and more particularly, the inner peripheral surface of a peripheral cover section 38 and the outer peripheral surface of the inertia weight element 30 are formed thereon with a plurality of projections 58a and 58b, resulting in being formed into, for example, a corrugated shape. Such construction causes a gel element 32 to be formed in a zigzag or corrugated manner, so that the inertia damper may exhibit damping characteristics different from the embodiments described above. The remaining part of the embodiment may be constructed in substantially the same manner as the embodiment shown in FIG. 2.

Referring to FIG. 6 showing still another embodiment of an inertia damper according to the present invention, an inertia damper of the embodiment is so constructed that the area of arrangement of a gel element 32 is increased without increasing the effective diameter of a mount base 28. For this purpose, a peripheral cover section 38 of a holding member 34 and the outer peripheral an inertia weight element 30 are tapered. Thus, the inertia damper is generally formed into a substantially frust-constructed shape. The remaining part of the embodiment may be constructed in substantially the same manner as the embodiment shown in FIG. 2.

FIG. 7 shows yet another embodiment of an inertia damper according to the present invention. In an inertia damper of the embodiment, a peripheral cover section 38 of a holding member 34 of a mount base 28 comprises an outer sleeve or cover plate 50 and an inner sleeve 52 as in the embodiment shown in FIG. 4. Also, in the embodiment, a plurality of sets of units 54 each comprising a combination of the inner sleeve 52 and an inertia weight element 30 are prepared. The number of sets of the units 54 is selected depending upon damping characteristics desired. The remaining part of the embodiment may be constructed in substantially the same manner as the embodiment of FIG. 2.

Figure 8:
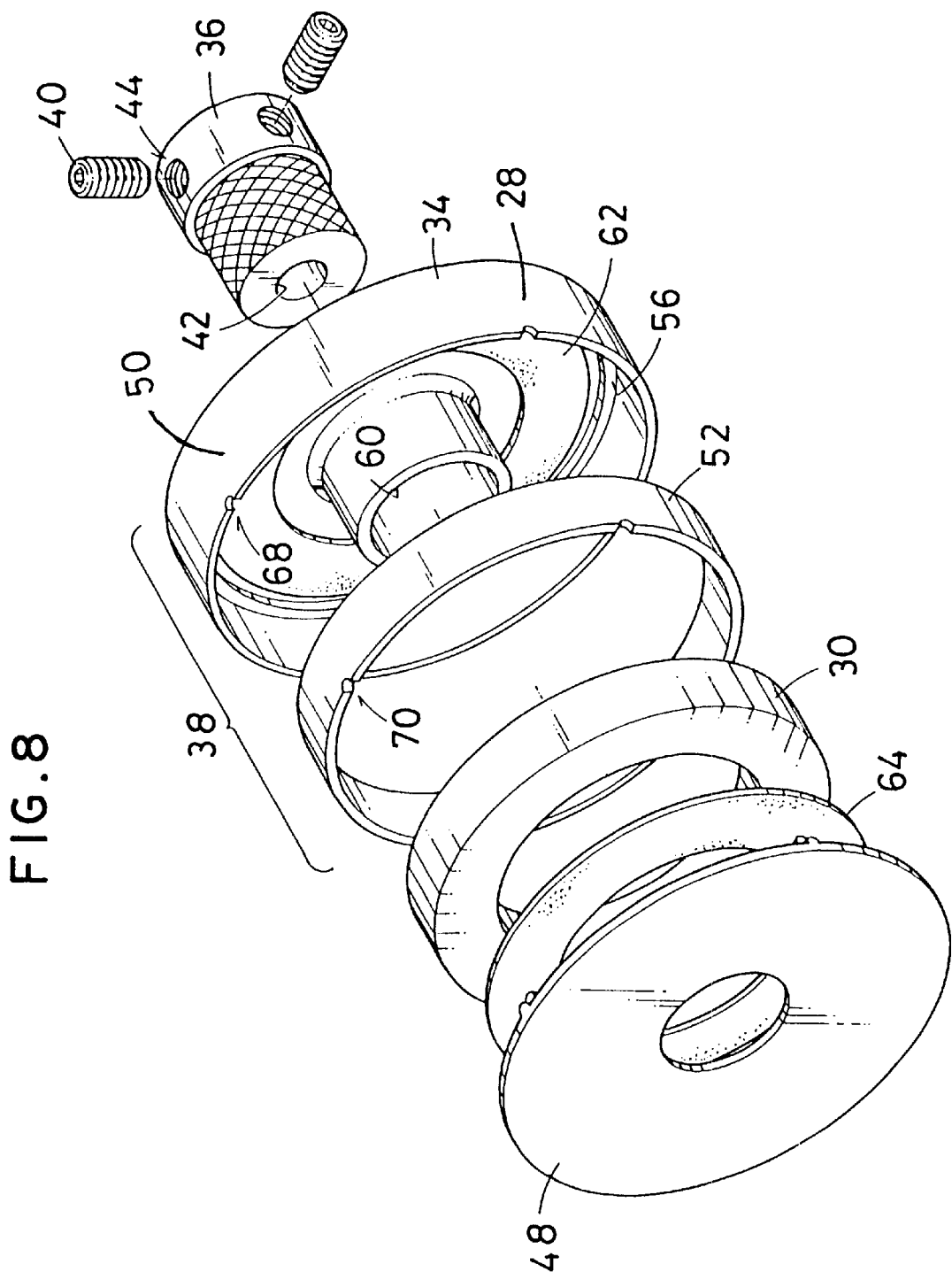
FIG. 8 is an exploded perspective view showing a still further embodiment of an inertia damper according to the present invention.
Figure 9:
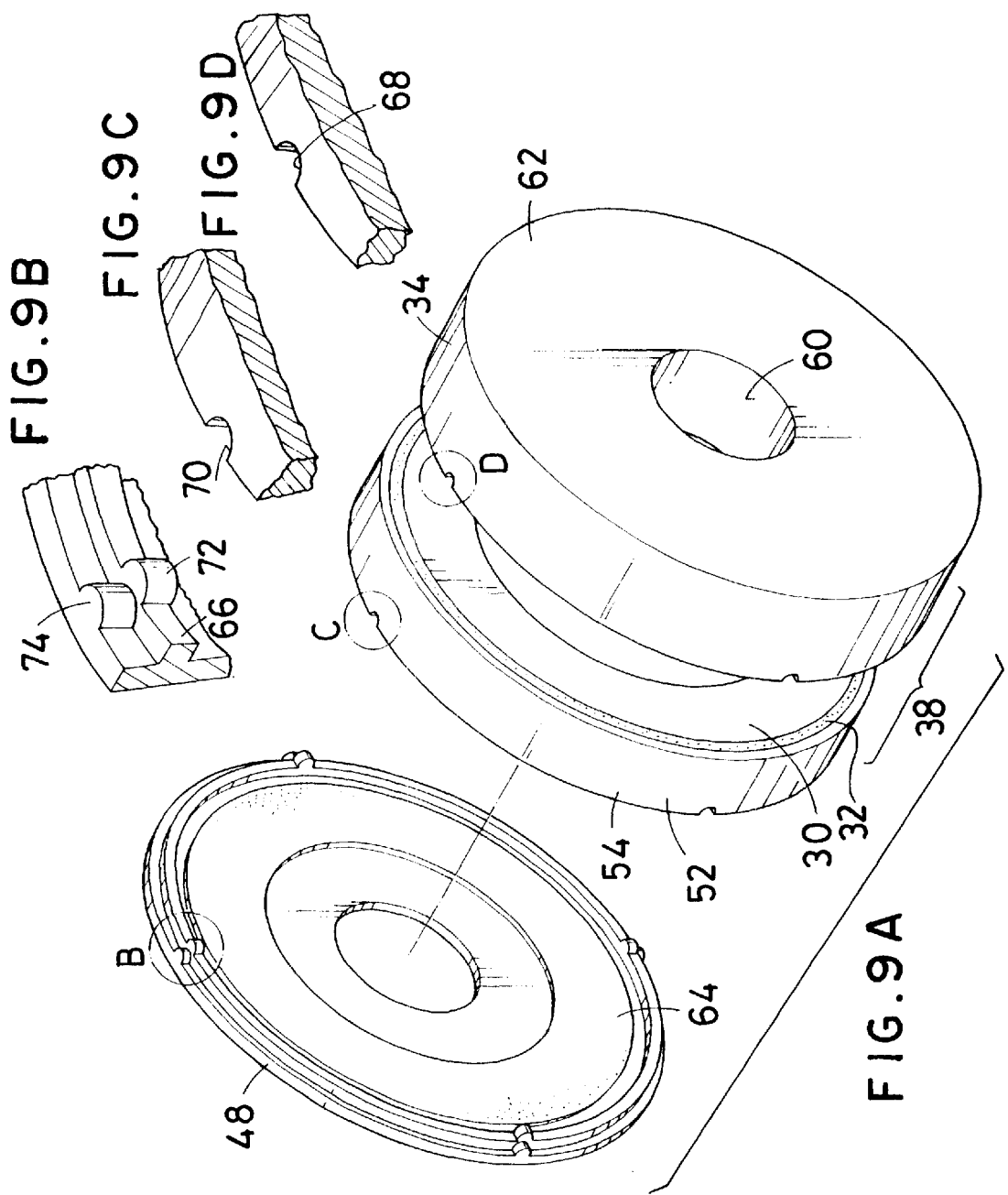
FIG. 9A is a fragmentary exploded perspective view showing an essential part of the inertial damper shown in FIG. 8.
FIG. 9B is a fragmentary enlarged perspective view showing a part indicated at a circle A in FIG. 9A.
FIG. 9C is a schematic enlarged perspective view showing a part indicated at a circle B in FIG. 9A.
FIG. 9D is a schematic enlarged perspective view showing a part indicated at a circle C in FIG. 9A.
Figure 10:
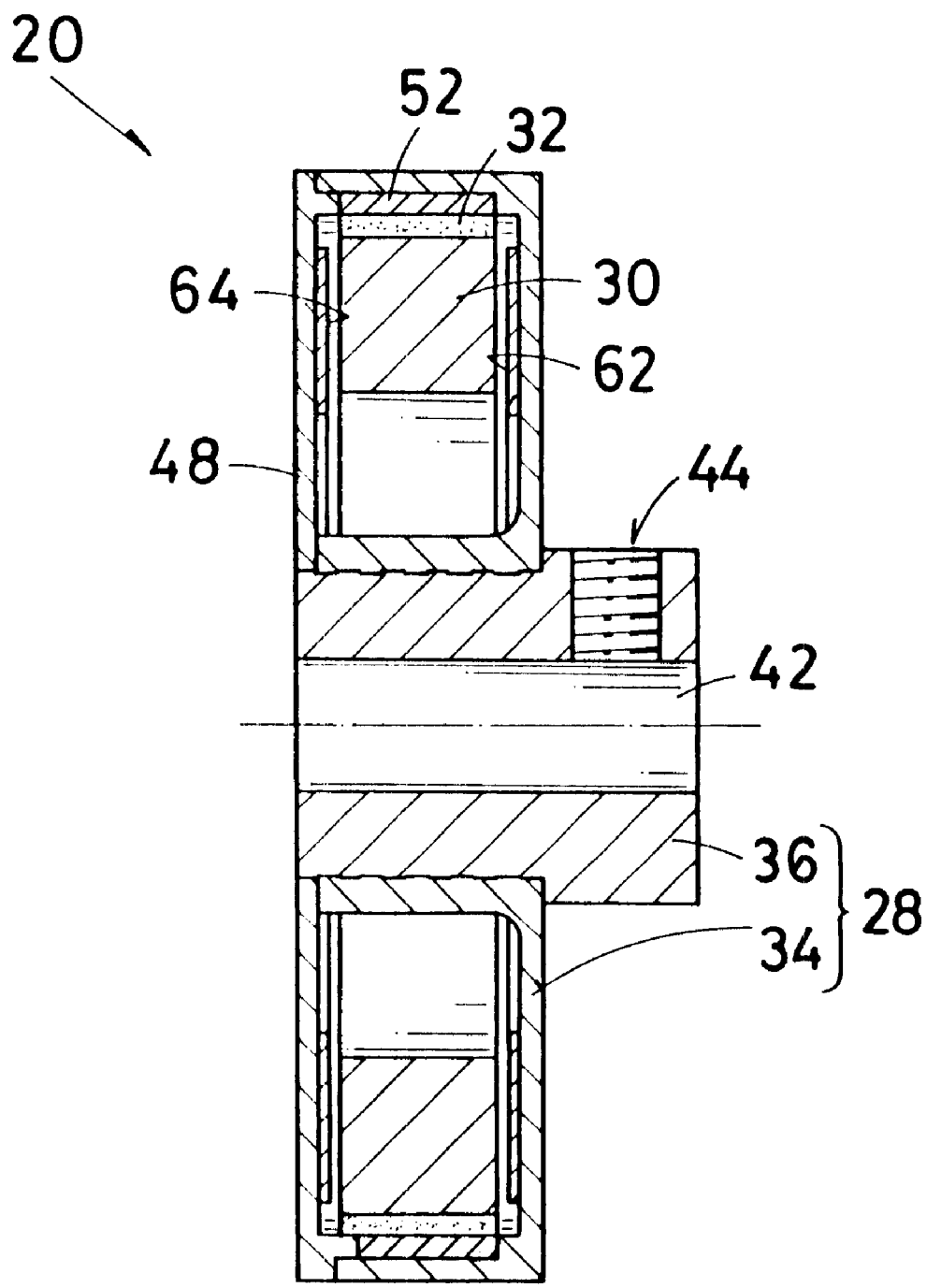
FIG. 10 is a side elevation view of a section of the inertia damper shown in FIG. 8.

FIG. 8 shows a still further embodiment of an inertia damper according to the present invention. An inertia damper of the embodiment is so constructed that an inertia weight element 30 and a gel element 32 are sealedly received in a mount base 28. The inertia damper 20 of the embodiment will be described together with manufacturing of the damper with reference to FIGS. 8 to 11D. In the embodiment, a peripheral cover section 38 of a holding member 34 of a mount base 28 comprises an outer cover plate 50 and an inner sleeve 52 as in the embodiment shown in FIG. 4. A boss 36 and the holding member 34 are formed integrally with each other by insert molding as shown in FIG. 11B. For this purpose, the boss 36 is hold in place in a plastic mold 100 and then a molten plastic resin material forming the holding member 34 such as, for example, polyester, nylon, polyacetal or the like is injected or poured into the mold 100. The plastic resin material is likewise used for forming the inner sleeve 52 separate from the outer cover plate 50 and constituting the peripheral cover section 38 in cooperation with the plate 50 and a lid 48. In order to ensure joining between the holding member 34 and the boss 36, it is preferably that the boss 36 is formed on the outer peripheral surface thereof with unevenness such as knurl, serration or the like. Such unevenness ensures fixed engagement by bite between a boss fit-in section of the holding member 34 and the boss 36. In order to reduce possible friction of the inertia weight element 30 with respect to the holding member 34, the 31 may be provided on the inner surface friction reducing means 62. More considered that the inertia weight contacts with the inner surface of the holding member when the inertia weight element 30 is accidentally deflected in the thrust direction. In view of this fact, the friction reducing means 62 is provided on the of the inner surface of the holding member 34 with which the inertia weight element 30 possibly contacts. In the embodiment, the friction reducing means 62 comprises a low-friction plate. The low-friction plate 62 may comprise a thin plate formed of a resin material of a low friction coefficient such as fluoroplastic. Such construction may be applied to the portion of the inner surface of the lid 48 with which the inertia weight element 30 likewise possibly contacts. For this purpose, a lid-side low-friction plate 64 is arranged on the inner surface of the lid 48, as shown in FIGS. 8 and 9.

Then, the inertia weight element 30 and inner sleeve 52 are assembled integrally in the mount base 28. Such integral assembling is desirable because it improves the manufacturing efficiency and safely protects the gel element 32 which substantially affects the performance of the inertial damper. For this purpose, a unit 54 (FIG. 9A) is previously formed which comprises the inertia weight element 30, inner sleeve 52 and gel element 32 formed between the inertia weight element 30 and the sleeve 52, for example, as shown in FIG. 11A. The inertia weight element 30 and the inner sleeve 52 are held sideways by means of a jig 102 and a gel material for the gel element 32 poured into the gap between the element 30 and the sleeve poured into the gap between the element 30 and the sleeve 52, resulting in the unit being formed. Then, the unit 54 is incorporated into the holding member 34 integrally coupled to the boss 36, as shown in FIG. 11C. First, the unit 54 comprising the inertia weight element 30, gel element 32 and the inner sleeve 52 is pressedly fitted in the holding member 34. This causes the inner peripheral surface of the outer cover plate 50 to contact the outer peripheral surface of the inner sleeve 52. Then, the lid 48 is mounted on the open end of the mount base 28 to sealedly close it. The lid 48, as shown in FIG. 9B, is formed at the portion of the inner surface thereof positioned somewhat inside from the outer periphery thereof with a fit-in rib 66, which serves to accurately position the lid 48 with respect to the holding member 34 and accurately position the inner sleeve 52 in a housing space defined in the holding member 34. After the unit is thus built in the holding member 34 as shown in FIG. 11C, the outer periphery of the holding member 34 and the lid 48 are heated by internal heating techniques such as ultrasonic heating or the like to carry out welding between the outer cover plate 50 and the inner sleeve 52 and welding between the inner sleeve 52 and the lid 48, as well as welding between the lid 48 and the distal end of the boss fit-in section 60 of the holding member 34, as shown in FIG. 11D. In order to more rigidly assemble the inertia damper, the holding member 34, inner sleeve 52 and lid 48 may be fixed to one another. For this purpose, for example, the peripheral cover section 38 of the holding member 34 is provided at the free end thereof with at least one recess 68 and positionally correspondingly the inner sleeve 52 is provided at the free end thereof with at least one recess 70. Also, the lid 48 is provided on the inner surface thereof with at least one projection 72 engaged with the recess 70 of the inner sleeve 52 in a manner to positionally correspond to the recesses 70, as well as at least one projection 74 engaged with the recess 68 of the peripheral cover section 38. In the illustrated embodiment, four such recesses 68 and 70 and projections 72 and 74 are formed. The arrangement of such recesses and projections permits rigid fixing among the holding member 34, inner sleeve 52 and lid 48 to be carried out because of securely positioning these members with respect to one another.

The inertia damper of each of the embodiments described above may be mounted on, for example, a stepping motor, as shown in FIG. 2. Vibration or the like transiently produced from the stepping motor 22 when it is started is effectively absorbed by the cooperation between the inertia weight element and the gel element, so that the vibration may be rapidly extinguished and the stepping motor 22 may be stably increased in rotational speed while being prevented from being stopped due to resonance at an intermediate frequency.

Figure 1:
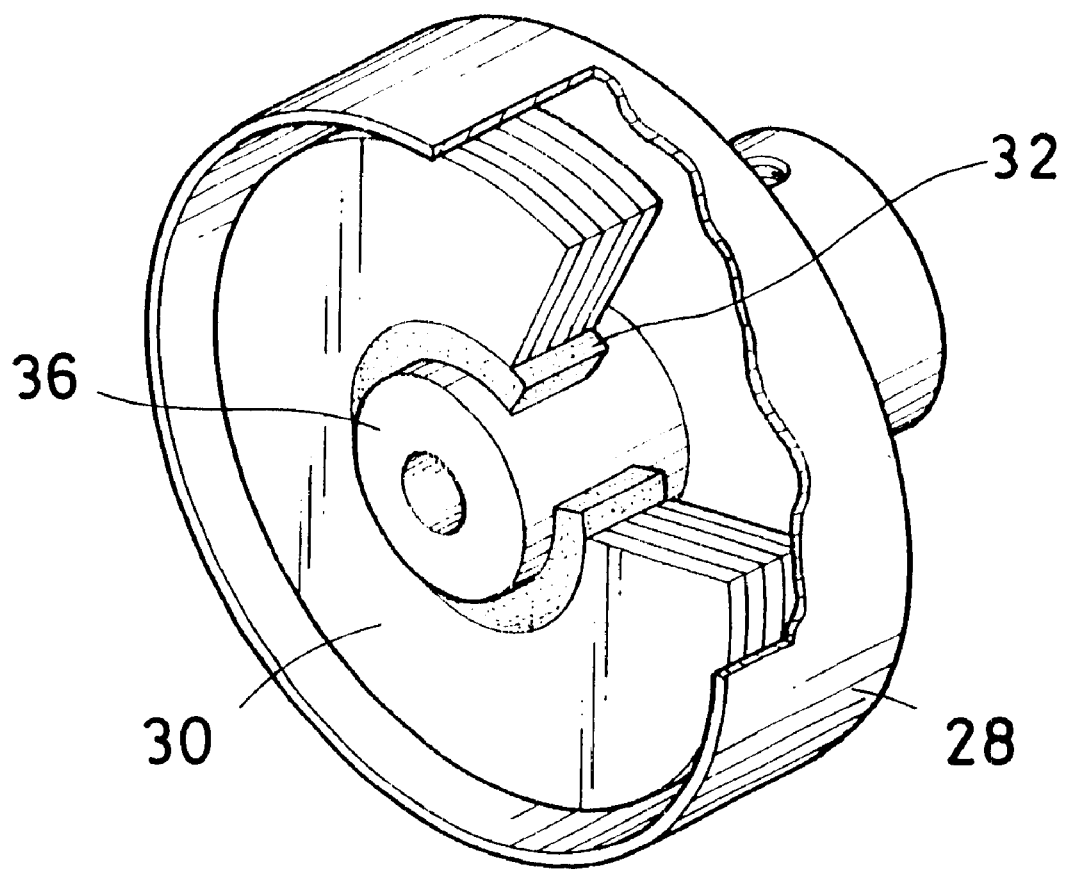
FIG. 1 is a perspective view showing a conventional inertia damper.

As can be seen from the foregoing, the inertia damper of the present invention is so constructed that in the combination of the inertia weight element directly carrying out a damping action and the gel element, the gel element is interposedly arranged between the outer periphery of the inertia weight element and the inner surface of the peripheral cover section of the holding member. Such construction permits the area of arrangement of the gel element to be increased to reduce loading per unit area of the gel element, resulting the inertia damper of the present invention exhibiting much more satisfactory endurance as compared with such a conventional inertia damper as shown in FIG. 1. This will be readily understood from the following Table showing results of a comparison test.

TABLE

Comparison in Performance between Present Invention and Prior Art

|  | Present Invention | Prior Art |
|---|---|---|
| Settling Time | 10–19 msec | 14–19 msec |
| Intermediate Frequency Resonance | None | None (Initially occurrence) |
| Endurance (Test by Inventor) | Above ten million times | Hundred thousand times |
| Stability of Performance | Very good | Ordinary |
| Relative Amount of Gel Material used | 2.3 | 1 |
| Relative Adhesion Area | 1.6 | 1 |
| Force applied to Unit Area of Gel Element | Small | Large |

The comparison test was carried out under the same conditions. As will be noted from Table, the present invention and prior art were substantially identical in settling time which is a vibration converging time which determines converging performance. Also, both effectively prevented generation of resonance at an intermediate frequency. However, it will be noted that the present invention exhibited endurance 100 times or more as much as the prior art.

Further, the inertia damper of the present invention may be so constructed that the peripheral cover section is covered with the lid to keep the housing space closed. Such construction effectively prevents entrance of dust or the like into the inertia damper and leakage of volatiles of the gel element to the exterior of the damper. Moreover, the arrangement of the positioning or engagement means on the lid, holding member and inner sleeve leads to rigid and accurate fixing therebetween. In addition, in the present invention, the friction reducing means may be provided between the mount base and the inertia weight element and/or between the lid and the inertia weight element. This effectively prevents each of these members from being damaged due to friction therebetween.

While preferred embodiments of the invention have been described with a certain degree of particularity with reference to the accompanying drawings, obvious modifications and variations are possible in the light of the above teachings. It is, therefore, to be understood that within the scope of the appended claims, the invention may be practiced otherwise than as specifically described.

What is claimed is:

1. An inertia damper comprising:
   a mount base including an annular peripheral cover section within which is defined a housing space, said annular peripheral cover section having an inner peripheral surface;
   an inertia weight element mounted in said housing space and having an outer peripheral surface; and
   a gel element interposed between said outer peripheral surface of said inertia weight element and said inner peripheral surface of said annular peripheral cover section of said mount base, said gel element being fixed to said mount base and to said inertia weight element, so as to couple said inertia weight element to said mount base and to absorb vibrations.

2. An inertia damper as recited in claim 1, wherein
   said mount base comprises a boss and a holding member mounted on said boss, said holding member being at least partially defined by said annular peripheral cover section.

3. An inertia damper as recited in claim 2, wherein
   said peripheral cover section of said holding member comprises an annular outer cover plate having an inner peripheral surface, and an annular inner sleeve having an inner peripheral surface and an outer peripheral surface, said annular inner sleeve being mounted within said annular outer cover plate; and
   said inner peripheral surface of said annular inner sleeve defines said inner peripheral surface of said annular peripheral cover section of said mount base, such that said gel element is interposed between said outer peripheral surface of said inertia weight element and said inner peripheral surface of said annular inner sleeve and is fixed to said annular inner sleeve, so as to couple said inertia weight element to said annular inner sleeve and to absorb vibrations.

4. An inertia damper as recited in claim 3, wherein
   said annular inner sleeve is mounted with a tight fit within said annular outer cover plate, so as to fix said annular inner sleeve to said annular outer cover plate.

5. An inertia damper as recited in claim 4, wherein
   said annular inner sleeve, said gel element, and said inertia weight element define a pie-assembled unit for mounting within said annular outer cover plate.

6. An inertia damper as recited in claim 5, wherein
   said mount base further comprises a lid mounted to said annular peripheral cover section to enclose said housing space.

7. An inertia damper as recited in claim 3, wherein
   said mount base further comprises a lid mounted to said annular peripheral cover section to enclose said housing space.

8. An inertia damper as recited in claim 2, further comprising
   friction reducing means for reducing friction between said holding member and said gel element.

9. An inertia damper as recited in claim 8, wherein
   said friction reducing means is interposed between said holding member and an axial end of said gel element.

10. An inertia damper as recited in claim 2, wherein
    said mount base further comprises a lid mounted to said annular peripheral cover section to enclose said housing space; and
    said inertia damper further comprises friction reducing means provided for reducing friction between said lid and said gel element and for reducing friction between said holding member and said gel element.

11. An inertia damper as recited in claim 1, wherein
    said mount base further comprises a lid mounted to said annular peripheral cover section to enclose said housing space.

12. An inertia damper as recited in claim 11, further comprising
    means for positively securing said lid to said mount base.

13. An inertia damper as recited in claim 12, wherein
    said means for positively securing comprises at least one recess formed in said annular peripheral cover section and at least one projection, complementary to said at least one recess, formed on said lid.

14. An inertia damper as recited in claim 12, wherein said means for positively securing comprises at least one recess formed in said annular inner sleeve and at least one projection, complementary to said at least one recess, formed on said lid.

15. An inertia damper as recited in claim 2, wherein said mount base further comprises a lid mounted to said annular peripheral cover section to enclose said housing space.

16. An inertia damper as recited in claim 11, further comprising
friction reducing means for reducing friction between said lid and said gel element.

17. An inertia damper as recited in claim 16, wherein said friction reducing means is interposed between said lid and an axial end of said gel element.

18. An inertia damper as recited in claim 1, wherein
at least one of said inner peripheral surface of said annular peripheral cover section and said outer peripheral surface of said inertia weight element is formed with an uneven surface.

19. An inertia damper as recited in claim 18, wherein
both of said inner peripheral surface of said annular peripheral cover section and said outer peripheral surface of said inertia weight element are formed with uneven surfaces.

* * * * *